United States Patent [19]
Genise et al.

[11] Patent Number: 6,042,507
[45] Date of Patent: Mar. 28, 2000

[54] TORQUE CONVERTER LOCKUP CONTROL

[75] Inventors: Thomas A. Genise, Dearborn; Ronald K. Markyvech, Allen Park, both of Mich.

[73] Assignee: Eaton Corporation, Cleveland, Ohio

[21] Appl. No.: 09/295,578

[22] Filed: Apr. 22, 1999

[51] Int. Cl.$^7$ ..................................................... B60K 41/02
[52] U.S. Cl. .......................................... 477/181; 477/174
[58] Field of Search ..................................... 477/181, 168, 477/174

[56] References Cited

U.S. PATENT DOCUMENTS

| | | | |
|---|---|---|---|
| 4,716,999 | 1/1988 | Tezuka et al. | 477/181 |
| 4,860,861 | 8/1989 | Gooch et al. | 192/3.26 |
| 5,136,897 | 8/1992 | Boardman . | |
| 5,141,089 | 8/1992 | Nobumoto et al. | 477/181 |
| 5,332,073 | 7/1994 | Iizeika | 477/174 |
| 5,406,861 | 4/1995 | Steeby | 74/366 |
| 5,441,464 | 8/1995 | Markyvech | 477/109 |
| 5,487,004 | 1/1996 | Amsallen . | |
| 5,509,867 | 4/1996 | Genise | 477/120 |
| 5,527,238 | 6/1996 | Hrovat et al. | 477/181 |
| 5,562,571 | 10/1996 | Maruyama et al. | 477/174 |
| 5,853,350 | 12/1998 | Hasegawa et al. | 477/174 |

*Primary Examiner*—Sherry L. Estremsky
*Attorney, Agent, or Firm*—Howard D. Gordon

[57] ABSTRACT

A control for providing a smooth, high quality torque converter lockup event in an automated mechanical transmission system (10) including a fuel-controlled engine (12) and a mechanical transmission (14) drivingly coupled by a torque converter and torque converter lockup clutch assembly (16). To achieve smooth torque converter lockup, engine torque is smoothly ramped down to a relatively low value and maintained at that value until the torque converter lockup clutch is effectively engaged.

16 Claims, 6 Drawing Sheets

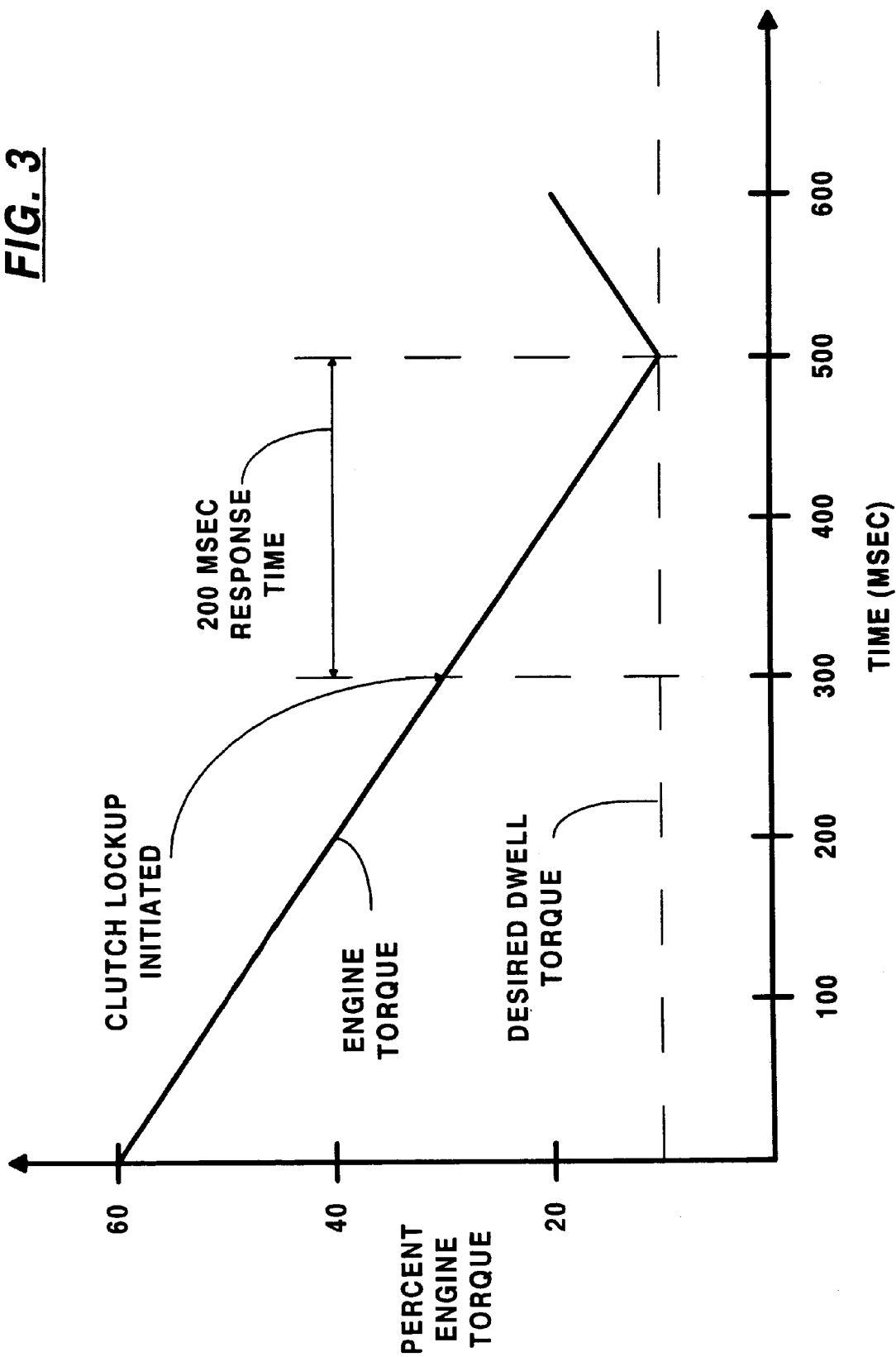

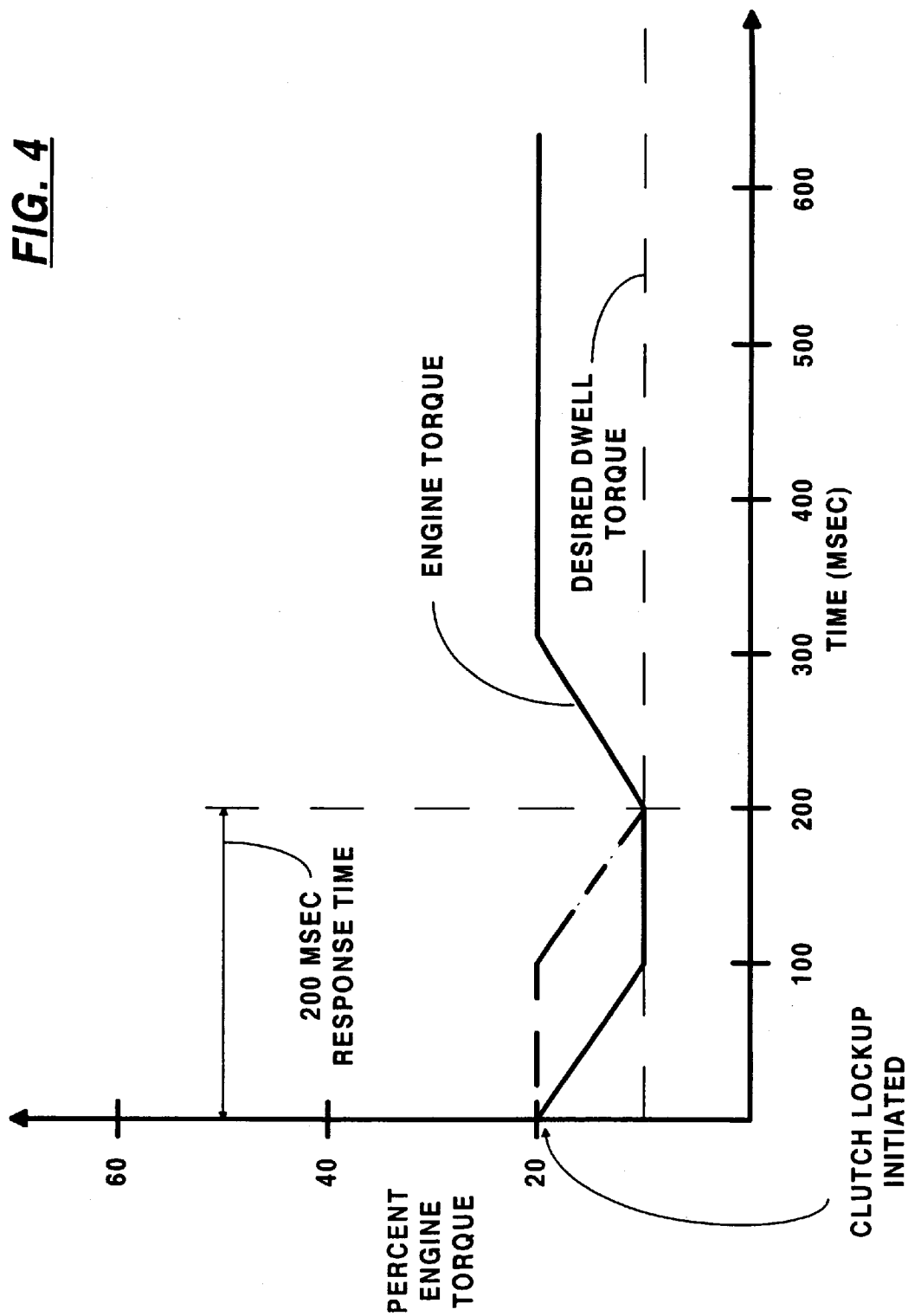

TORQUE CONVERTER LOCKUP CONTROL

BACKGROUND OF THE INVENTION

1. Field of the Invention

The present invention relates to controls for torque converter lockup and/or bypass clutches. In particular, the present invention relates to a control for engaging a torque converter lockup clutch in a vehicular automated mechanical transmission system.

2. Description of the Prior Art

Automated mechanical transmission systems are known in the prior art, as may be seen by reference to U.S. Pat. Nos. 4,361,060; 4,595,986; 4,850,236; 5,406,861; 5,441,464; 5,487,004 and 5,509,867, the disclosures of which are incorporated herein by reference. Automated mechanical transmission systems having torque converters and torque converter lockup or bypass clutches are available under the "CEEMAT" trademark from EATON CORPORATION, assignee of this application. Transmission systems of this type may be seen by reference to U.S. Pat. Nos. 4,784,019; 4,850,861; 5,099,711 and 5,136,897, the disclosures of which are incorporated herein by reference.

In the past, automated mechanical transmission systems having torque converters and torque converter lockup clutches locked up the torque converter at a specific engine RPM, usually determined at least in part by vehicle speed, without any modulation of engine torque. While this tended to result in somewhat harsh lockup events, it was not unacceptable, as the vehicles using such systems in the past tended to be heavy-duty construction and/or off-road vehicles. Such control logic, however, is less than satisfactory for systems utilized in heavy-duty, over-the-road vehicles or coaches.

SUMMARY OF THE INVENTION

In accordance with the present invention, a control is provided for controlling the torque converter lockup clutch of an automated mechanical transmission system which will result in a relatively smooth, high quality lockup event. The control utilizes data link commands, such as are available on an SAE J-1939-compliant data link, to modulate engine torque during the lockup. Engine torque is ramped smoothly down to a relatively low "dwell torque" (about 0% to 20% of engine torque), while the torque converter is locked up and is then ramped smoothly back to the driver-demanded torque. The ramping down of engine torque is sequenced to the known, relatively slow, response time of the lockup clutch.

Accordingly, it is an object of the present invention to provide a new and improved lockup clutch control which will provide smooth, high quality torque converter lockup events.

This and other objects and advantages of the present invention will become apparent from a reading of the description of the preferred embodiment taken in connection with the attached drawings.

BRIEF DESCRIPTION OF THE DRAWINGS

FIGS. 3 and 4 are graphs illustrating the control of the present invention.

DESCRIPTION OF THE PREFERRED EMBODIMENT

Figure 1:
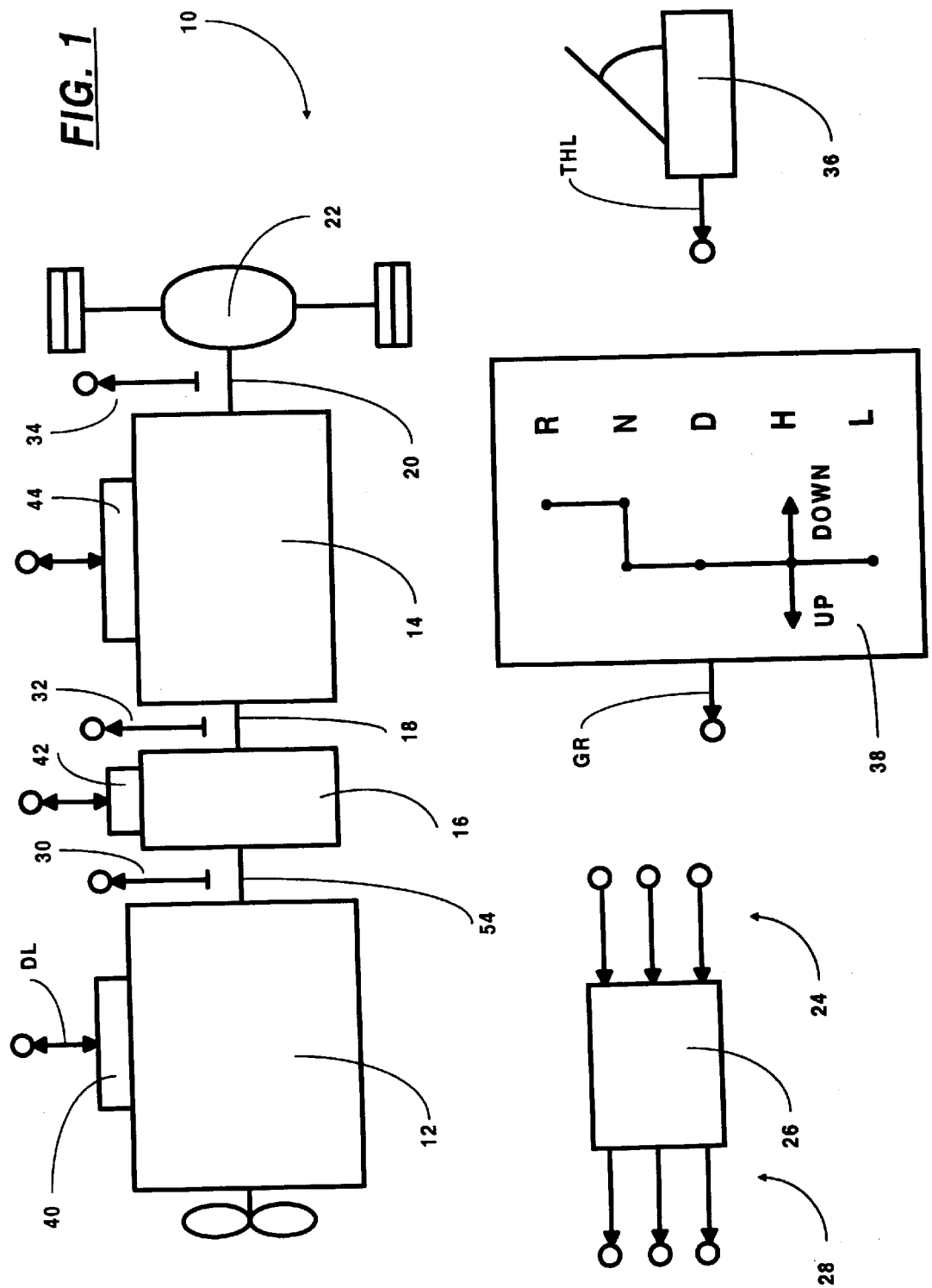
FIG. 1 is a schematic illustration of a vehicular automated mechanical transmission system utilizing a torque converter and lockup clutch assembly to drivingly connect the engine to the transmission.

The term "mechanical transmission" is used to designate a change-speed or change-gear transmission having a plurality of selectable ratios between the input and output shafts thereof, which may be selectively engaged and disengaged by the selective engagement and disengagement of positive jaw clutches. A vehicular automated mechanical transmission system of the type advantageously utilizing the control of the present invention may be seen by reference to FIGS. 1 and 2. Automated mechanical transmission system 10 includes a fuel-controlled internal combustion engine 12 (such as a well-known diesel engine or the like), a multiple-speed mechanical transmission 14, and a torque converter and torque converter lockup clutch assembly 16 for drivingly connecting the transmission input shaft 18 to the engine 12. The transmission 14 further includes an output shaft 20 for driving the vehicle drive axles 22.

Transmission 14 may be of the known mechanical type utilizing positive jaw clutches to engage and disengage selected gears to shafts for changing the ratio of input shaft rotational speed (IS) to output shaft rotational speed (OS). Transmissions of this type may be seen by reference to U.S. Pat. Nos. 4,764,665; 5,385,056; 5,390,561 and 5,416,698, the disclosures of which are incorporated herein by reference.

System 10 may include a plurality of sensors for providing input signals 24 to a microprocessor-based control unit 26, which will process the input signals according to logic rules to generate command output signals 28 to various system actuators.

Speed sensors 30, 32 and 34 may be provided to provide input signals to the controller indicative of engine speed, transmission input shaft speed, and transmission output shaft speed, respectively. A sensor 36 may be provided to provide an input signal indicative of the operator setting of the throttle pedal. A driver control console 38 is provided to allow the operator to select a transmission mode and to provide an input signal, GR, indicative thereof to the controller 26.

An engine controller 40, preferably microprocessor-based, may be provided for controlling fueling of the engine and for providing information to a data link, DL, indicative of the operating parameters of the engine. Preferably, the data link will comply with a known protocol, such as SAE J-1939 or the like. An actuator 42 is provided for operating the torque converter and torque converter lockup clutch assembly 16. A transmission actuator 44 may be provided for operating the transmission 14 and for providing signals indicative of the engaged gear ratio and/or other transmission operating parameters.

Figure 2:
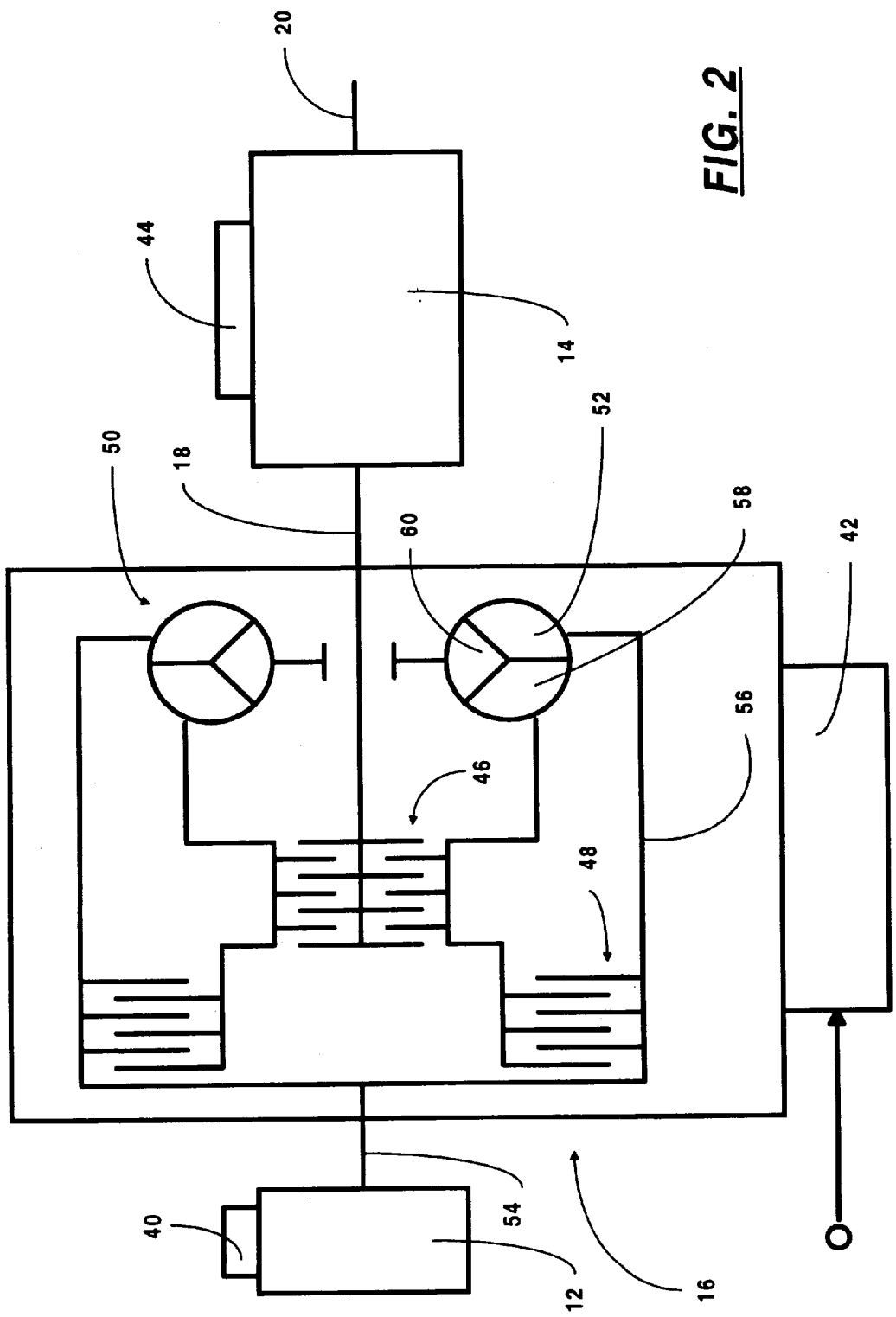
FIG. 2 is an enlarged schematic illustration of the torque converter and lockup assembly of the system illustrated in FIG. 1.

FIG. 2 provides a schematic representation of the torque converter and torque converter lockup assembly 16. In the preferred embodiment, the torque converter and torque converter lockup clutch assembly also will include a disconnect clutch member, allowing the inertia of the assembly to be disconnected from the transmission input shaft 18, allowing easier synchronization of the gear ratios thereof during engagement of a transmission target gear ratio.

The torque converter lockup and disconnect clutch assembly 16 includes two separate, independently engageable clutches (preferably friction clutches), a torque converter disconnect clutch 46, and a torque converter lockup or bypass clutch 48. The torque converter assembly 50 is conventional in that it includes a fluid coupling of the torque converter type having an impeller 52 driven by the engine output or crank shaft 54 through a shroud 56, a turbine 58 hydraulically driven by the impeller, and a stator or runner 60 which becomes grounded to a housing via a one-way roller clutch or the like (not shown).

The transmission input shaft 18 is driven by the engine 12 via the torque converter and torque converter clutch lockup assembly 16. Transmission input shaft 18 may be selectively connected to or disconnected from the torque converter and torque converter disconnect clutch assembly by means of the disconnect clutch 46. With the disconnect clutch 46 engaged, the input shaft 18 will be driven by the torque converter impeller 58 if the lockup clutch 48 is disengaged and will be driven by the engine crank shaft 54 via shroud member 56 when the lockup clutch 48 is engaged. Actuator 42 is effective to independently engage and disengage the clutches 46 and 48. When engaged, lockup clutch 48 engages the impeller 58 to the shroud 56 and effectively locks up or bypasses the torque converter 50.

As is well known, a torque converter provides advantageous operation during vehicle launch and low-speed operation. However, to maximize fuel economy and minimize torque converter slip and, therefore, heat generation, it is desirable to lock up the torque converter as soon as possible after launch of the vehicle. An accepted rule of thumb is to lock up the torque converter as soon as possible without adversely affecting vehicle operation. Usually, the torque converter is locked up so that the engine speed after the lockup event is generally not below peak engine torque (usually about 1200 RPM for a heavy-duty truck diesel engine). At light throttle, it is desirable to lock up the torque converter at a slightly lower engine speed (about 1000 RPM). Therefore, the optimum is to have a throttle-modulated lockup point ranging from about 1000 RPM to about 1200 RPM for a typical heavy-duty vehicle diesel engine.

According to the control of the present invention, in order to achieve smooth torque converter lockup, data link (preferably SAE J-1939 protocol or the like) control commands are used to manipulate engine torque during lockup. With these commands, the engine output torque can be ramped smoothly down to a desired torque while the torque converter is locked up (i.e., clutch 48 engaged), and then the commands are used to smoothly ramp the engine torque back up to the driver demand. One very important consideration in this control method is the factoring in of the relatively slow response time of the torque converter lockup function. Typically, the response time for lockup clutch 48 to become engaged after a command to the actuator 42 is about 200 milliseconds. It is the function of the control of the present invention to monitor the torque level and determine how to best achieve the torque converter lockup event at the desired torque level for overall best driver impression (i.e., for best torque converter lockup event quality).

Engine torque is ramped down to a value (the "dwell torque") which, it has been empirically determined, provides the smoothest and highest quality torque converter clutch lockup event. For heavy-duty vehicles, the desired dwell torque is relatively low, about 0% to 20% of engine torque, preferably 10% of engine torque or lower. The engine torque will be gradually lowered to and will dwell at this value until the lockup clutch 48 becomes engaged. As will be seen below, the engine will dwell at this value only momentarily unless the engine is at a relatively low torque value at initiation of the torque converter clutch lockup event.

FIGS. 3 and 4 illustrate, respectively, a torque converter clutch lockup event according to the control of the present invention for a situation starting at relatively high and relatively low engine torques. For purposes of example only, in both FIGS. 3 and 4, the following variables are used. Control algorithm loop time is 10 milliseconds. Torque converter lockup clutch response time is 200 milliseconds. The engine torque ramp rate for both increasing and decreasing engine torque is 1% per 10-millisecond loop. The torque dwell value is 10% of engine torque, and the torque lockup RPM is 1000 to 1200 RPM.

In FIG. 3, the torque converter lockup event is initiated at a relatively high engine torque, 60% of engine torque. At initiation of the event, engine torque is caused to ramp down smoothly to the dwell torque value of 10%. At the predetermined ramp-down rate, this will require 500 milliseconds. At 300 milliseconds, the torque converter lockup clutch 48 is commanded to engage, which engagement should be effective in 200 milliseconds or at 500 milliseconds from initiation of the torque converter lockup event. Accordingly, engine torque will be at the desired dwell torque value, 10% of engine torque, as the torque converter lockup clutch 48 engages. At that time, engine torque may be ramped up smoothly to the amount demanded by the driver.

In FIG. 4, the torque converter clutch lockup event is initiated when the engine is at a relatively low torque, 20% of engine torque. In this situation, it will only require 100 milliseconds for the engine to smoothly ramp down to the desired dwell torque of 10%. Accordingly, at initiation of the torque converter lockup event, the torque converter lockup clutch 48 is commanded to engage, which will occur within 200 milliseconds, and the engine begins to slowly ramp down to the desired dwell torque. At 100 milliseconds, the engine will reach the desired dwell torque and will dwell at this value until 200 milliseconds, when the lockup clutch 48 is expected to be engaged. At that point in time, the engine torque will be ramped up to the driver's demand torque, as illustrated. Alternatively, as illustrated in dashed lines, engine torque may be held at the 20% level until the 100 millisecond time and then ramped down to the desired dwell torque.

Figure 5A:
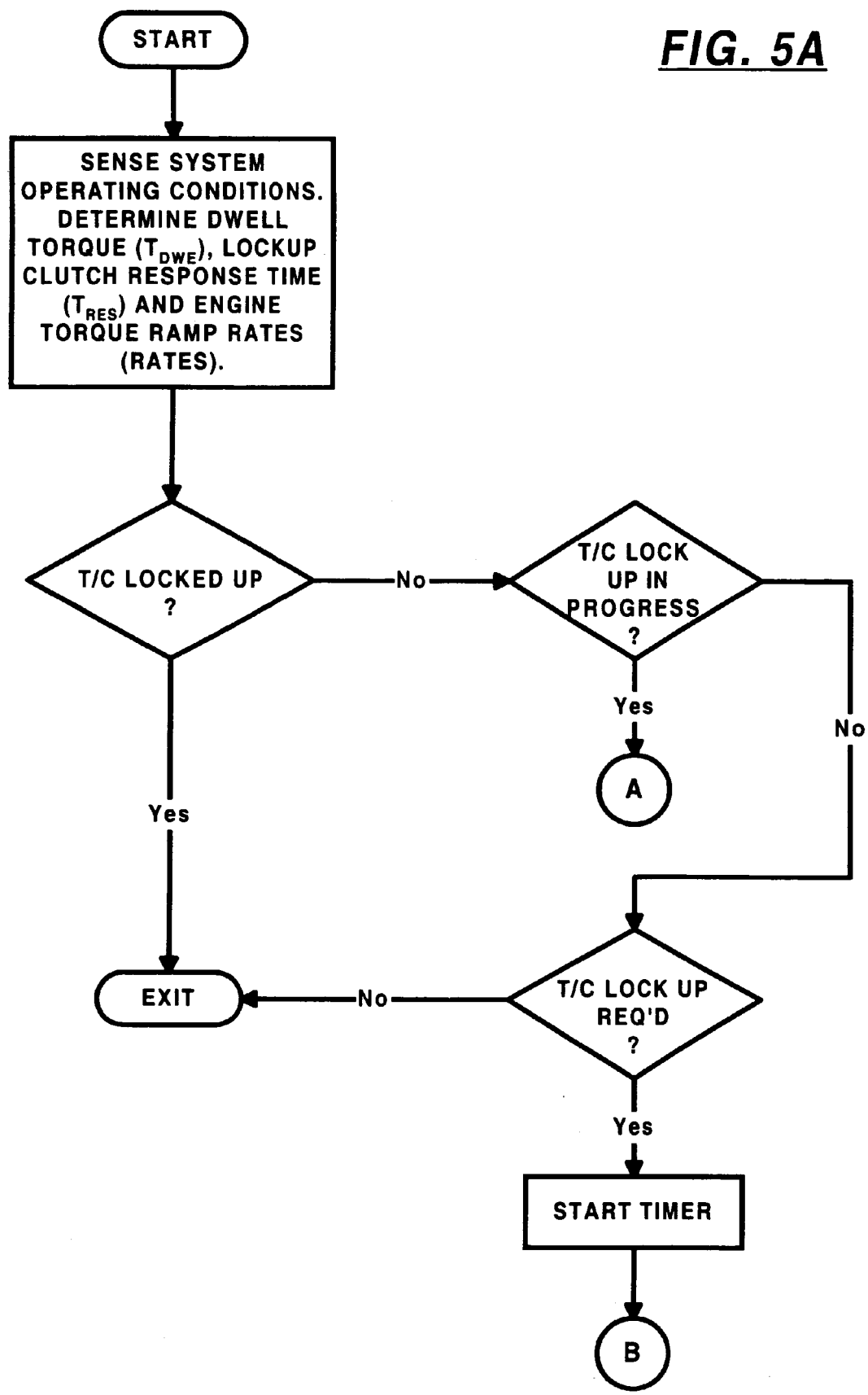
FIG. 5 is a flow chart illustrating the control of the present invention.
Figure 5B:
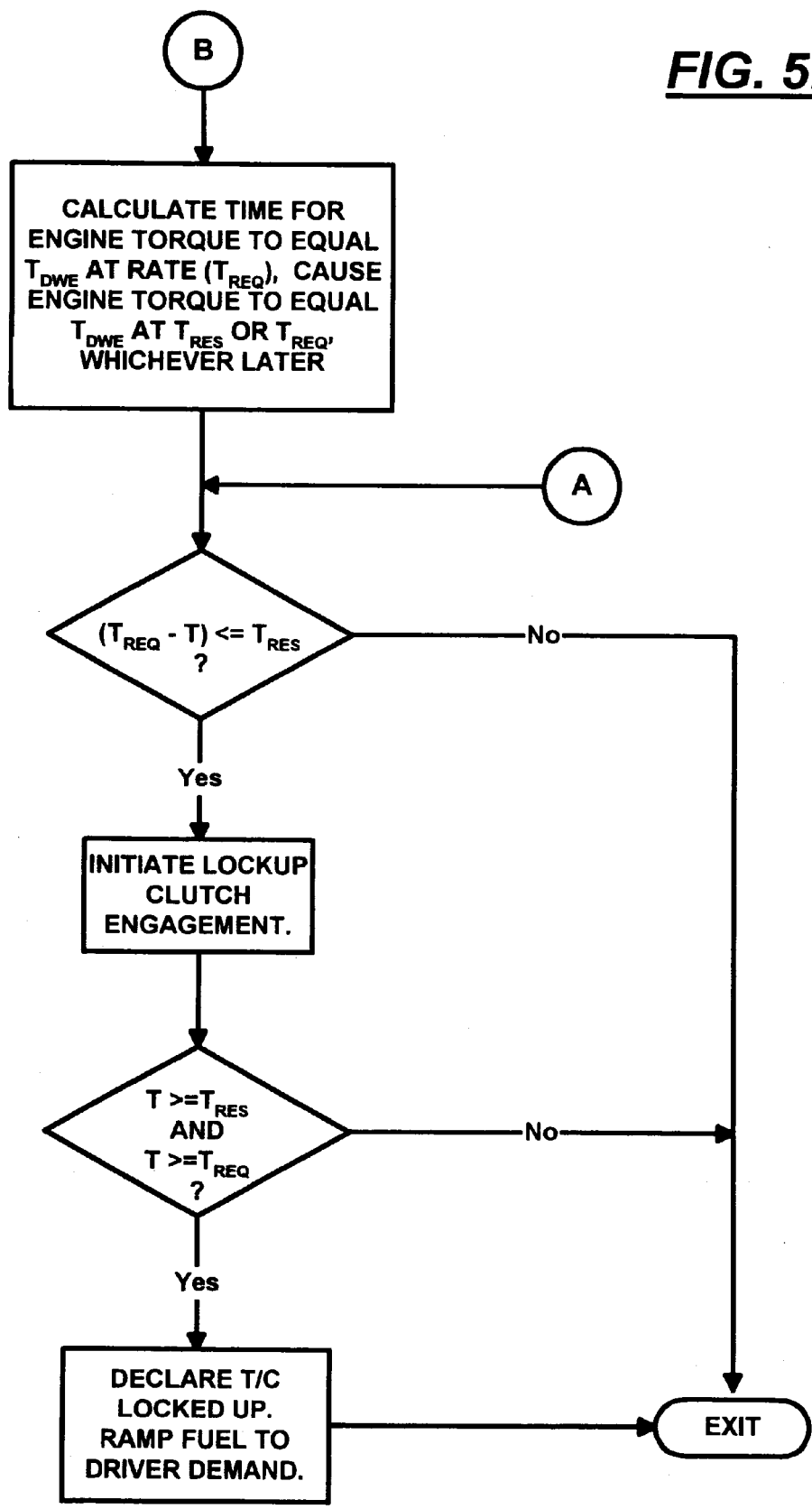

By smoothly ramping engine torque down to a predetermined dwell torque value and arriving at or dwelling at that value until the lockup clutch engagement is expected to be engaged, and thereafter smoothly ramping fuel back to operator's demand, has been shown to provide a smooth and high quality torque converter lockup event. The control of the present invention may be seen in flow chart format by reference to FIG. 5.

Although the present invention has been described with a certain degree of particularity, it is understood that various modifications are possible without departing from the spirit and scope of the invention as hereinafter claimed.

We claim:

1. A method for controlling an automated mechanical transmission system comprising a fuel-controlled engine, an engine controller for controlling fueling of the engine, a multiple-speed mechanical transmission, and a torque converter and torque converter lockup clutch mechanism for drivingly coupling the transmission to the engine, said method comprising the steps of:

(a) sensing values of parameters indicative of system operating conditions;

(b) determining a response time ($T_{res}$) for the lockup clutch to engage;

(c) determining a desired engine torque value ($T_{dwe}$) for engagement of the lockup clutch;

(d) determining a desirable rate for decreasing engine torque to said desired engine torque value (RATE);

(e) upon sensing a requirement for engaging the torque converter lockup clutch, causing engine torque to decrease at said desirable rate to said desired engine torque value and initiating engagement of said lockup clutch to engage only when or after said engine torque is equal to said desired engine torque value.

2. The method of claim 1 wherein said desired engine torque value is no greater than 10% of full engine torque.

3. The method of claim 1 further comprising the steps of:

(f) determining a desirable rate for increasing engine torque after engagement of the lockup clutch; and (g) after engagement of said lockup clutch, causing engine torque to increase from said desirable engine torque to a torque value requested by the operator at said desirable rate for increasing engine torque.

4. The method of claim 1 wherein said desirable rate to decrease engine torque is about 1% of full engine torque every 10 milliseconds.

5. The method of claim 1 wherein said desired engine torque value is no greater than 20% of full engine torque.

6. The method of claim 5 wherein said desirable rate to decrease engine torque is about 1% of full engine torque every 10 milliseconds.

7. The method of claim 1 wherein the requirement for engaging said lockup clutch is determined as a function of engine speed.

8. The method of claim 7 wherein the requirement for engaging said lockup clutch is also determined as a function of operator-set throttle position.

9. The method of claim 1 wherein step (e) comprises:

(i) sensing current engine torque at initiation of a torque converter lockup clutch lockup event;

(ii) determining the time ($T_{req}$) required to decrease engine torque to said desired engine torque value; and (a) if the time required to decrease engine torque to said desired engine torque value exceeds said response time ($T_{req}>T_{res}$), then initiating engagement of the lockup clutch only after a time period equal to the time required minus the response time ($T_{req}-T_{res}$) after beginning to decrease engine torque.

10. The method of claim 9 further comprising step (ii)(b), if the response time exceeds the time required ($T_{res}>T_{req}$), then immediately initiating engagement of the lockup clutch.

11. A system for controlling an automated mechanical transmission system comprising a fuel-controlled engine, an engine controller for controlling fueling of the engine, a multiple-speed mechanical transmission, and a torque converter and torque converter lockup clutch mechanism for drivingly coupling the transmission to the engine, said system comprising:

(a) means for sensing values of parameters indicative of system operating conditions;

(b) means for determining a response time ($T_{res}$) for the lockup clutch to engage;

(c) means for determining a desired engine torque value ($T_{dwe}$) for engagement of the lockup clutch;

(d) means for determining a desirable rate for decreasing engine torque to said desired engine torque value (RATE);

(e) means effective, upon sensing a requirement for engaging the torque converter lockup clutch, to cause engine torque to decrease at said desirable rate to said desired engine torque value and initiate engagement of said lockup clutch to engage only when or after said engine torque is equal to said desired engine torque value.

12. The system of claim 11 wherein said desired engine torque value is no greater than 10% of full engine torque.

13. The system of claim 11 further comprising:

(f) means for determining a desirable rate for increasing engine torque after engagement of the lockup clutch; and (g) means effective, after engagement of said lockup clutch, to cause engine torque to increase from said desirable engine torque to a torque value requested by the operator at said desirable rate for increasing engine torque.

14. The system of claim 11 wherein said desirable rate to decrease engine torque is about 1% of full engine torque every 10 milliseconds.

15. The system of claim 11 wherein said desired engine torque value is no greater than 20% of full engine torque.

16. The system of claim 15 wherein said desirable rate to decrease engine torque is about 1% of full engine torque every 10 milliseconds.

* * * * *